US009821961B2

(12) United States Patent
Beesley et al.

(10) Patent No.: US 9,821,961 B2
(45) Date of Patent: Nov. 21, 2017

(54) ADJUSTABLE CONVEYING DEVICE

(71) Applicant: Illinois Tool Works Inc., Glenview, IL (US)

(72) Inventors: Robert C. Beesley, Greenville, SC (US); Chad Jones, Forest, VA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/138,420

(22) Filed: Apr. 26, 2016

(65) Prior Publication Data

US 2016/0347549 A1    Dec. 1, 2016

Related U.S. Application Data

(60) Provisional application No. 62/169,000, filed on Jun. 1, 2015.

(51) Int. Cl.
*B65G 17/12* (2006.01)
*B65G 23/26* (2006.01)
*B65G 17/26* (2006.01)
*B65G 47/28* (2006.01)

(52) U.S. Cl.
CPC ............. *B65G 23/26* (2013.01); *B65G 17/26* (2013.01); *B65G 47/28* (2013.01); *B65G 2207/08* (2013.01)

(58) Field of Classification Search
CPC ........ B65G 15/12; B65G 15/14; B65G 17/32; B65G 17/12
USPC ......... 198/817, 867.08, 803.11, 626.3, 803.4
See application file for complete search history.

(56) References Cited

U.S. PATENT DOCUMENTS

| 2,639,025 | A |   | 5/1953  | Schmitt         |             |
|-----------|---|---|---------|-----------------|-------------|
| 4,641,742 | A | * | 2/1987  | Igarashi        | B65G 15/105 |
|           |   |   |         |                 | 198/626.5   |
| 4,718,540 | A | * | 1/1988  | Greenwell       | B65B 59/02  |
|           |   |   |         |                 | 198/620     |
| 4,741,525 | A |   | 5/1988  | Ebmeyer et al.  |             |
| 4,893,707 | A | * | 1/1990  | Langen          | B65G 17/26  |
|           |   |   |         |                 | 198/626.3   |
| 5,038,919 | A | * | 8/1991  | Harston         | B65G 17/26  |
|           |   |   |         |                 | 198/626.1   |
| 5,238,101 | A | * | 8/1993  | Ota             | B65G 17/26  |
|           |   |   |         |                 | 198/626.5   |
| 5,328,021 | A | * | 7/1994  | Calvert         | B65B 59/005 |
|           |   |   |         |                 | 198/626.5   |
| 6,024,207 | A | * | 2/2000  | Looser          | B65G 17/26  |
|           |   |   |         |                 | 198/473.1   |
| 6,149,377 | A |   | 11/2000 | Loppnow         |             |

(Continued)

FOREIGN PATENT DOCUMENTS

EP        1067048 A1    1/2001

*Primary Examiner* — James R Bidwell
(74) *Attorney, Agent, or Firm* — JK Intellectual Property Law, PA

(57) ABSTRACT

A device and method of adjusting a spacing of holders located on first and second endless loop includes releasing a clutch to allow the endless loops to be adjusted and operating an adjustment assembly to simultaneously move the first endless loop a distance in a first direction and the second endless loop an equal distance in a second direction opposite the first direction. After the adjustment the timing and pitch of the center of articles gripped by the holders is unchanged relative to the system in which the device is located.

3 Claims, 6 Drawing Sheets

(56) References Cited

U.S. PATENT DOCUMENTS

| | | | | |
|---|---|---|---|---|
| 6,161,678 | A * | 12/2000 | Cassoli | B65G 17/26 198/626.6 |
| 6,210,281 | B1 | 4/2001 | Robinson et al. | |
| 6,811,024 | B2 * | 11/2004 | Wieduwilt | B65B 43/52 198/803.13 |
| 7,752,828 | B2 * | 7/2010 | Gudim | B65B 5/068 198/803.11 |

* cited by examiner

ADJUSTABLE CONVEYING DEVICE

CROSS-REFERENCE TO RELATED APPLICATIONS

This application is a United States Non-Provisional Patent Application, claiming benefit to U.S. Provisional Patent Application Ser. No. 62/169,000, filed Jun. 1, 2015 which is incorporated by reference herein.

TECHNICAL FIELD

The present disclosure relates generally to a device and method for adjusting spacing of holders in a conveying system while maintaining timing and pitch of the articles to be gripped by the holders relative to the system.

BACKGROUND

Many conveying devices exist for transporting articles such as boxes. Some use flight bars, plates or other pushers that contact the conveyed boxes only from the rear to the thereby push the boxes along the conveying device. In other systems, boxes are gripped simultaneously from the front and rear as they are conveyed. The front and rear holders may be attached to separate endless loops, such as chains, which are driven at the same speed. A box is placed between a given set of holders and carried along the conveyor by the chains. The box typically enters and exits the conveyor at upstream and downstream ends where spacing between the given holders is larger, for example, as a leading or trailing holder travels out of a horizontal conveying plane and around an axle, making space for the box to be gripped by or released by the pair of holders.

Devices have been developed to adjust the spacing between holders on the two endless loops of such a conveyor to allow different-sized boxes to be securely conveyed. Such systems generally work well for their intended purposes but may require several adjustments to change box size. For example, if the relative position of only one endless loop conveyor and accordingly its holders is adjusted, the centerline of the articles being conveyed would change by half the amount of adjustment. Thus, although the pair of grippers would remain on pitch (i.e., spaced the same distance from each other), the timing of the conveying device would have to also be changed as compared to the rest of the system external to the conveying device. For example, both loops of the conveyor would have to be jogged forward or backward by a certain amount to synchronize with the timing of the system, typically by user input into a programmable logic controller or the like to drive servo motors to move both loops. Although such operation is effective, it adds steps and complexity to the adjustment process.

Accordingly, a secure, accurate, and simplified system for adjusting holders of endless loops on a conveyor that addressed one or more of the above issues, and/or that provided other benefits, would be welcome.

SUMMARY

Aspects and advantages of the disclosed subject matter will be set forth in part in the following description, or may be obvious from the description, or may be learned through practice of the disclosed subject matter.

For example, according to certain aspects of the disclosure, an adjustable conveying device for conveying articles of differing sizes may include a first endless loop drivable along a path, holders mounted along the first endless loop, a second endless loop drivable along a path substantially along the path of the first endless loop, and holders mounted along the second endless loop. Each holder on the first endless loop forms a gripping pair with an adjacent holder on the second endless loop, with each gripping pair being spaced equally from a center line between the holders of the gripping pair. A motor drives the first and second endless loops at a common speed along their respective paths. An adjustment assembly is configured for simultaneously moving the first endless loop a distance in a first direction along its path and the second endless loop the distance in a second direction opposite the first direction along its path to thereby change spacing between the gripping pairs while maintaining the holders in each gripping pair equidistant from their respective center line. Various options and modifications are possible.

The adjustment assembly may include a releasable clutch, which may be a manually releasable clutch, activation of which permits the simultaneous movement of the first and second endless loops.

The adjustment assembly may also include an input wheel, rotation of the input wheel after activation of the releasable clutch effecting the simultaneous movement of the first and second endless loops. The adjustment assembly may also include a first shaft driven in a first direction by rotation of the input wheel, rotation of the first shaft moving the first endless loop in the first direction, along with a second shaft driven in a second direction by rotation of the input wheel, rotation of the second shaft moving the second endless loop in the second direction.

The adjustment assembly may also include gearing so that rotation of the input wheel in a given direction rotates the first shaft in the first direction and the second shaft in the second direction. Also, the adjustment assembly may include a movable indicator to indicate the spacing of each gripping pair as the adjustment assembly moves the first and second endless loops.

According to certain other aspects of the disclosure, a method of adjusting a spacing of holders located on a first endless loop and a second endless loop, the method may include releasing a clutch to allow the endless loops to be adjusted; and operating an adjustment assembly to simultaneously move the first endless loop a distance in a first direction and the second endless loop the distance in a second direction opposite the first direction to thereby change spacing between a gripping pair of holders while maintaining the holders in the gripping pair equidistant from a center line between the pair of holders. Various options and modifications are possible.

For example, the operating step may include rotating an input wheel of the adjustment assembly to effect the simultaneous movement of the first and second endless loops. If so, the operating step may include rotating a first shaft in a first direction by rotation of the input wheel, rotation of the first shaft moving the first endless loop in the first direction, as well as rotating a second shaft in a second direction by rotation of the input wheel, rotation of the second shaft moving the second endless loop in the second direction.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
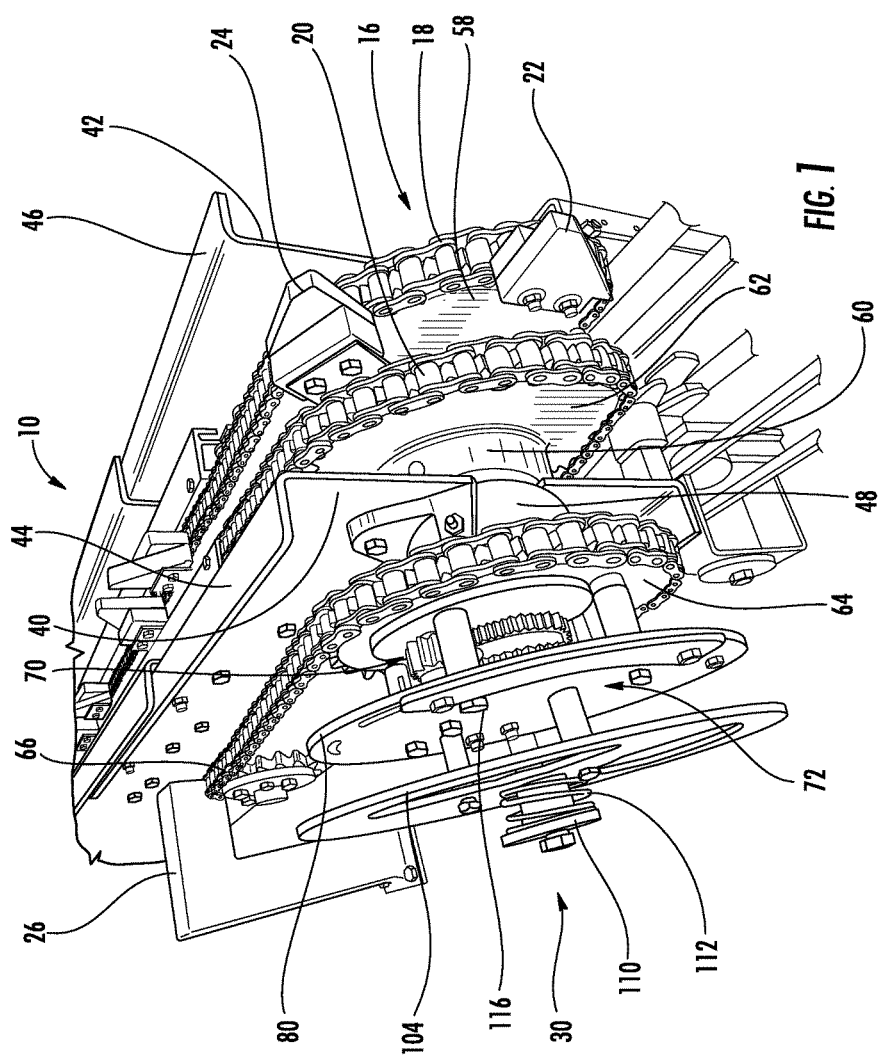
FIG. 1 is a perspective view of an end of a conveying device including an adjustment assembly according to certain aspects of the disclosure.

Reference now will be made in detail to embodiments of the disclosed subject matter, one or more examples of which are illustrated in the drawings. Each example is provided by way of explanation, not limitation. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
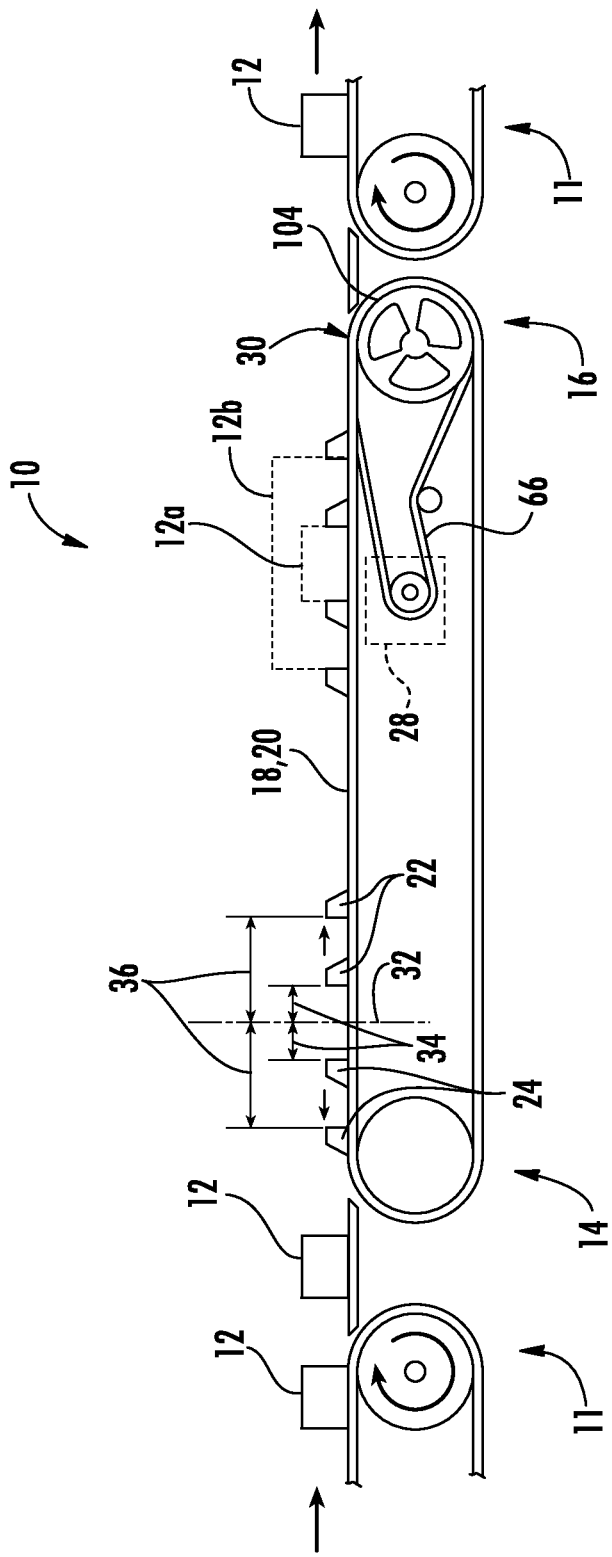
FIG. 2 is a diagrammatic side view of a conveying device as in FIG. 1 showing adjustment of article holders via the adjustment assembly.
Figure 3:
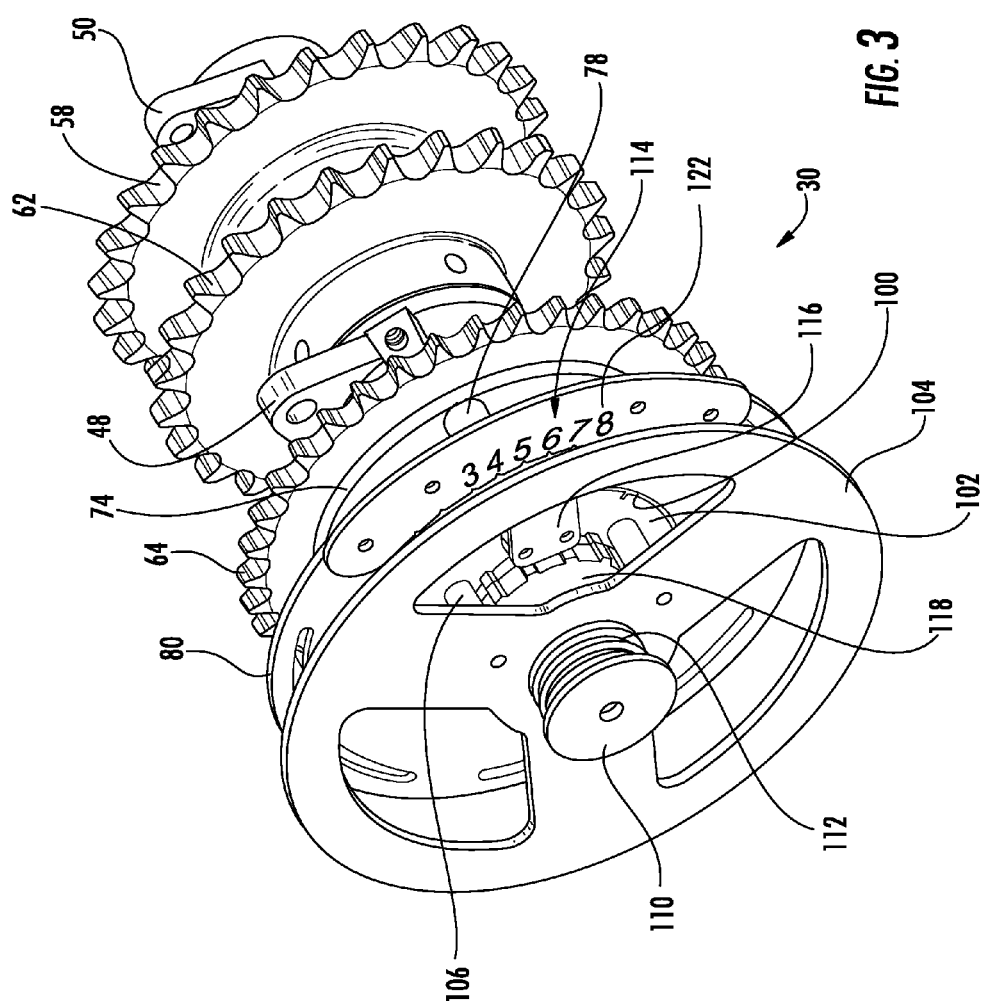
FIG. 3 is a perspective view of the adjustment assembly of FIG. 1 and related components.

FIGS. 1 and 2 show generally a conveying device 10 to be mounted within an overall conveying system 11. Conveying device 10 moves articles 12 from an upstream end 14 to a downstream end 16. Two endless loops 18 and 20 are mounted along a conveying surface (defined by members 44, 46, described below) extending along the top of device 10 between ends 14, 16. Holders 22, 24 are respectively mounted on loops 18, 20. Respective pairs of adjacent holders 22, 24 can hold and convey an article 12 along device 10. In a given pair that grip an article 12, holders 22 are in a leading position and holders 24 are in a following position, with respect to the gripped article. Frame 26 supports loops 18, 20, and motor 28 drives the loops, as will be described below.

An adjustment assembly 30 is attached to frame 26 at end 16, although it could also be located at end 14. Adjustment assembly 30 can simultaneously alter the spacing between holders 22 on loop 18 and holders 24 on loop 20, without changing the pitch of the holders 22, 24. That is, spacing of holders 22, 24 within a given pair from the respective centerline 32 between the pair is unchanged after adjustment of spacing between the holders via adjustment assembly 30. FIG. 2 shows holders 22, 24 both moved from a first distance 34 from centerline 32 to a second (larger) distance 36 from centerline 32. As both holders 22, 24 within a pair remain the same distance from centerline 32, the holders remain at the same timing and on pitch in terms of spacing along device 10 and with reference to the rest of system 11.

As a matter of illustration of concept in FIG. 2, articles 12a and 12b of different sizes are shown being held by holders 22, 24 before and after adjustment. It should be understood that differently-sized articles would not be carried by device 10 at the same time; one size or the other would be carried.

Pitch is determined for a given device by the number and location of holders 22, 24 on loops 18, 20, as a factor of the size(s) of articles to be conveyed, the desired speed of operation of device 10 and the speed and supply within system 11. Minimum pitch is defined in part by the smallest article that can be gripped between a pair of holders 22, 24, and maximum pitch is defined in part by the spacing at which holders in a given pair begin to overlap with holders in adjacent pairs. Minimum pitch for a device such as device 10 may be on the order of just a few inches. Maximum pitch may be on the order of several feet up to a substantial portion of the upper surface of conveying device 10. However, the pitch spacing, the article size, the conveying device size, are all functions of the application and articles to be used. Thus, no limitation should be taken from the examples given above.

Figure 4:
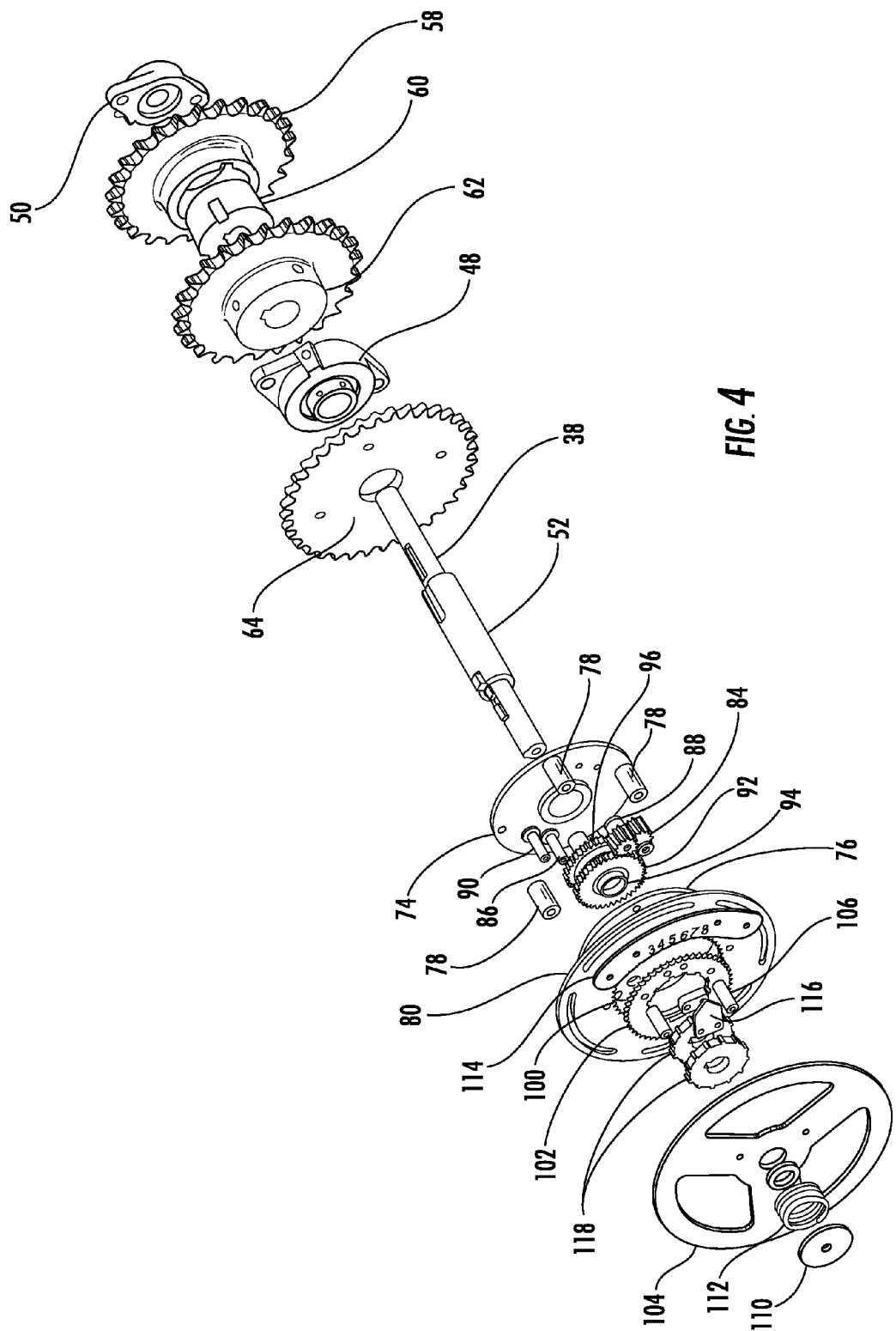
FIG. 4 is an exploded perspective view of the elements shown in FIG. 3.
Figure 5:
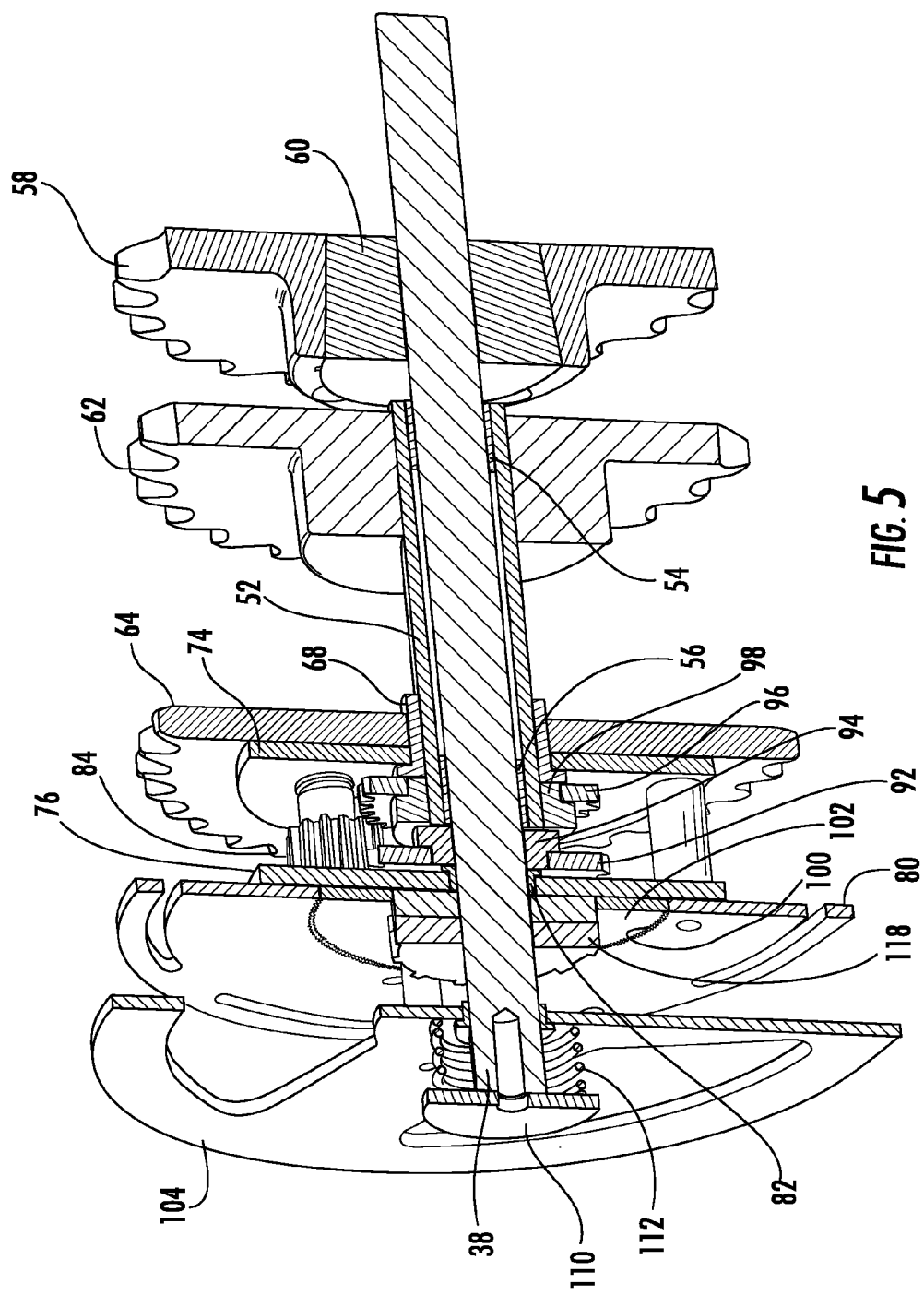
FIG. 5 is a side perspective, sectional view of the elements shown in FIG. 3, with bearings removed for clarity.
Figure 6:
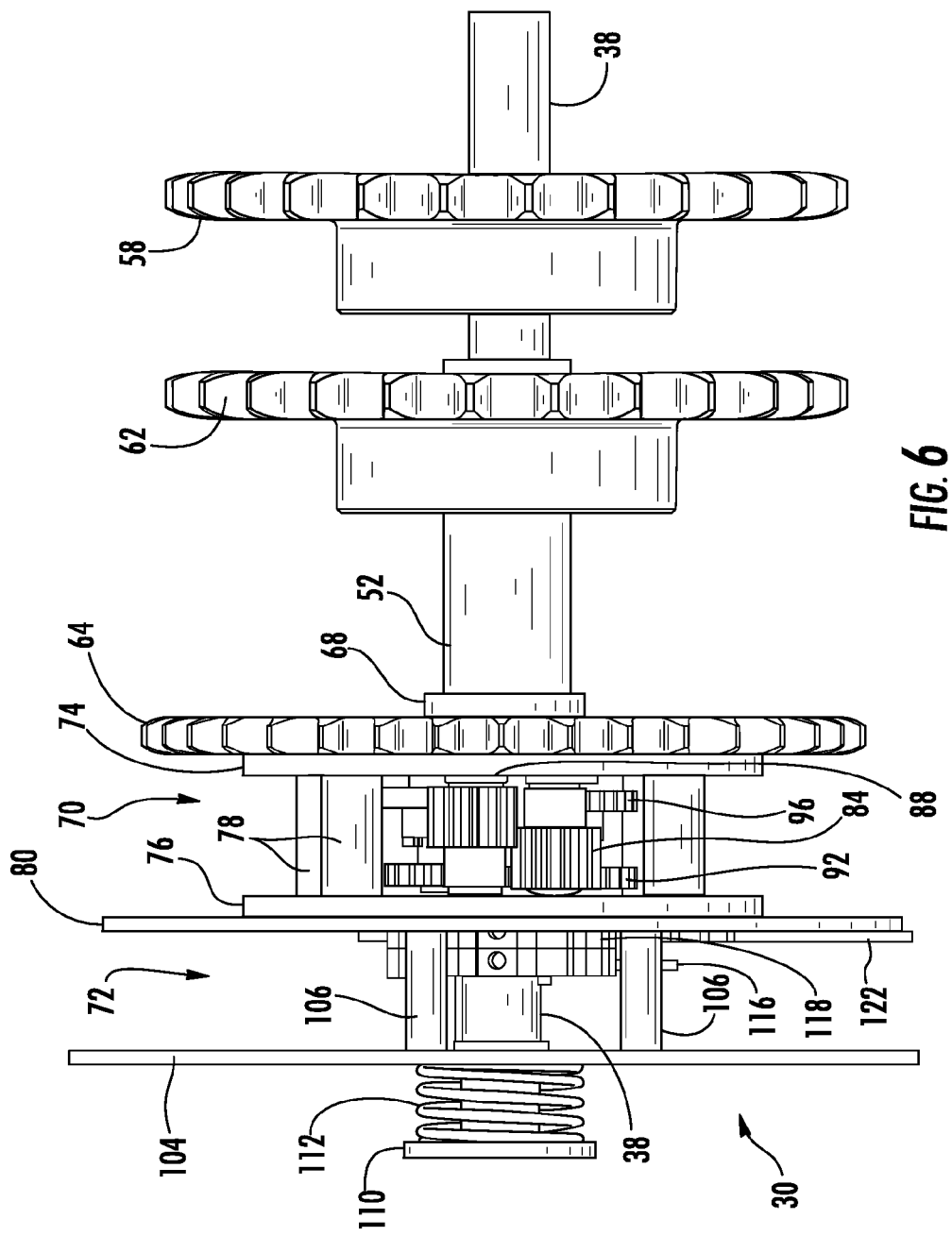
FIG. 6 is a side view of the elements shown in FIG. 5.

Axle 38 (See FIGS. 4-6) is mounted so as to extend through members 40, 42 at end 16 of frame 26 (see FIG. 1). Members 40, 42 may include or be attached to conveying surfaces 44, 46 on frame 26 adjacent upper portions of loops 18, 20. Bearings 48, 50 attach axle 38 to members 40, 42 so that axle 38 may rotate relative to frame 26. Sleeve 52 is mounted coaxially around axle 38 via internal bearings 54, 56 so that sleeve 52 can selectively rotate relative to axle 38, depending on engagement of a clutch assembly and/or input of gearing, to be described below. In operation, axle 38 acts as one driven shaft while sleeve 52 acts as another driven shaft.

Axle 38 is mounted to sprocket 58 via a bushing 60. Conventional keys, slots and the like may be employed to rotationally lock axle 38, bushing 60 and sprocket 58. Loop 18 is driven by sprocket 58.

Sleeve 52 is mounted to sprocket 62 via a conventional keys, slots, etc., so that sleeve 52 and sprocket 62 are rotationally locked. Loop 20 is driven by sprocket 62. Bearing 48 receives sleeve 52 so that sleeve 52 may rotate freely within bearing 48.

Sprocket 64 is driven by an endless loop such as a chain 66 that is itself driven by motor 28. Bearing 68 is located between sprocket 64 and sleeve 52 to allow sprocket 64 to rotate relative to sleeve 52. Sprocket 64 drives axle 38 and sleeve 52 via a gearing assembly 70 when a clutch assembly 72 is engaged. As shown, drive sprocket 64 has the same diameter as driven sprockets 58, 62, and gearing assembly 70 causes no speed changes, thereby providing an output speed at sprockets 58, 62 that is the same as input speed at sprocket 64. However, such speed relationships could be altered if desired by changing one of more of the sprocket gear ratios, the gearing assembly speed ratios, or the speed of drive chain 66, motor 28, etc.

Gearing assembly 70 includes a first plate 74 and a second plate 76 with spacers 78 between the plates to define an area in between. Fasteners (generally not shown herein for clarity) secure drive sprocket 64, first plate 74, spacers 78 and second plate 76 to a clutch plate 80, which is part of clutch assembly 72. All of these components move as a unit and may rotate together relative to axle 38 and sleeve 52, depending on gearing and clutch operation. First plate 74 is disposed around bearing 68 to allow relative rotation with reference to sleeve 52. Second plate 76 is disposed around a bearing 82 to allow relative rotation with reference to axle 38.

Gearing assembly 70 further includes a first gear 84 mounted rotatably on a shaft 86 and a second gear 88 mounted rotatably on a shaft 90, both shafts extending between plates 74, 76. First and second gears 84, 88 are mounted with some offset in a direction along the central axis of axle 38 (see FIG. 6), but with some overlap and enmeshed 1:1 ratio teeth so that the gears 84, 88 may rotate together. Therefore, rotation of gear 84 could rotate gear 88, depending on clutch orientation and orientation of other elements, described below.

Gearing assembly 70 also includes a first spur gear 92 and a second spur gear 96. The first spur gear 92 is mounted to axle 38 via a bushing 94. First spur gear 92, bushing 94 and axle 38 are attached so as to always rotate in unison. First spur gear 92 is also enmeshed with first gear 84 in a 1:1 ratio.

Second spur gear 96 is mounted to sleeve 52 via a bushing 98. Second spur gear 96, bushing 98 and sleeve 52 are attached so as to always rotate in unison. Second spur gear 96 is also enmeshed with second gear 88 in a 1:1 ratio.

Accordingly, during operation of device 10 to convey articles, motor 28 drives chain 66 and sprocket 64. Rotation of sprocket 64 is transmitted to axle 38 via first plate 74, first gear 84, first spur gear 92 and bushing 94. Rotation of sprocket 64 is also transmitted to sleeve 52 via first plate 74, second gear 88, second spur gear 96 and bushing 98. None of gears 84, 88, 92 and 94 moves relative to each other during operation of device; all such elements rotate as a unit between plates 74, 76. Accordingly, axle 38 and sleeve 52 rotate together in the same direction and at the same speed, thereby driving sprockets 58, 62 and loops 18, 20 together in the same direction and at the same speed.

To adjust spacing of holders 22, 24, device 10 is stopped and clutch assembly 72 is actuated. At this point, gears 84, 88, 92 and 94 are freed to rotate relative to each other and may, if directed, drive axle 38 and sleeve 52 to rotate in opposite directions, thereby moving loops 18, 20 in opposite directions, as described below.

As noted above, clutch plate 80 is mounted for rotation with second plate 76, for example by fasteners extending through to drive sprocket 64. Clutch plate 80 has a structure such as an internally toothed opening 100 that is selectively engageable with a structure such as an externally toothed gear 102. The toothing between opening 100 and gear 102 is finer than that of the sprockets and gears mentioned above, for example on the order of about 180 teeth around the circumference of gear 102. Gear 102 is thus positionable at discrete locations, 2 degrees apart, by repositioning the gear within opening 100 and allowing teeth to mesh. Once teeth of opening 100 and gear 102 are meshed, gear 102 rotates with clutch plate 80.

Gear 102 is mounted to a handle 104 via spacers 106 so that the handle rotates with the gear. Axle 38 extends through and is fixed to handle 104 via a bearing 108 so that rotation of axle 38 also rotates the handle 104 and vice-versa. An end cap 110 is attached to axle 38 and holds a spring 112 in compression between the end cap and handle 104. Spring 112 urges gear 102 into engagement with opening 100 and maintains it in place there via force applied via handle 104 and spacers 106. Pulling handle 104 away from plate 80 further compresses spring 112 and removes gear 102 from opening 100. Handle 104 thus acts as an input device to release a clutch formed by gear 102 and toothed opening 100.

Because handle 104 is fixed for rotation with axle 38, after handle is actuated axially to disengage gear 102 from opening 100, rotation of handle 104 transmits movement in the same direction to axle 38, sprocket 58 and loop 18. During such rotation of handle 104, first spur gear 92 also rotates with axle 38, thereby causing a rotation of a gear train of: first gear 84 (opposite direction), second gear 88 (same direction) and second spur gear 96 (opposite direction). Because second spur gear 96 is mounted for rotation with sleeve 52, the sleeve, sprocket 62 and loop 20 also move in the opposite direction as handle 104 and loop 18.

The amount that loops 18, 20 and holders 22, 24 move when handle 104 is turned is a factor of the relative rotation of gear 102 and opening 100, as well as the size of sprockets 58, 62. Thus, for a one tooth displacement (2 degrees; $\frac{1}{180}$ of circumference) between gear 102 and opening 100, with sprockets 58, 62 being 28 tooth (1 inch) sprockets, the movement of loops 18, 20 and holders 22, 24 is on the order of about 0.156 inch (28 inches*$\frac{1}{180}$). Of course, this is only one example. The tooth pitch on gear 102 could be different or some other arrangement rather than a toothed interface could be provided, and the diameter of sprockets 58, 62 could also be different. One skilled in the art could determine a desired adjustability, whether stepwise as above or continuous, for a particular application.

Therefore, during such rotation of handle 104 after disengaging the clutch, sprocket 62 rotates in the opposite direction and at the same speed as sprocket 58. Accordingly, loop 20 moves in the opposite direction and the same distance as loop 18. Holders 22, 24 in each given pair on loop 18, 20 are also moved an equal distance (apart or together, depending on which way handle 104 was turned) while maintaining their respective centerline 32. (See again FIG. 2, in which holders 22, 24 move from distance 34 to distance 36 from centerline 32, maintaining timing and pitch).

An indicating device 114 may be mounted to portions adjustable via disengaging of the clutch, such as axle 38 and/or clutch plate 80, to give information to the user as to the spacing between each given pair of holders 22, 24 during adjustment. As illustrated, indicating device 114 can include a pointer 116 mounted to a movable spline member 118 disposed around axle 38. Spline member 118 is internally keyed and fixed to axle 38 so as to rotate with axle 38; accordingly rotation of handle 104 after disengaging the clutch also rotates spline member 118 and pointer 116. External splining on spline member 118 matching the shape of an opening 120 in gear 102 allows such movement, although other features or attachment methods could be used. Pointer 116 could alternatively include indicia or a feature of some sort on handle 104 or gear 102, rather than being a separate part as noted above.

Accordingly, when handle 104 is pulled axially to compress spring 112, gear 102 slides along spine member 118 as gear 102 leaves opening 100. Rotation of handle 104 causes gear 102, spline member 118 and pointer 116 to rotate with axle 38 relative to clutch plate 80, which is held in place by sprocket 64 and chain 66 being stationary (i.e., because motor 28 is not being driven). If desired indicia 122 may be placed on or attached to clutch plate 80 ranging along the area where pointer 116 can be located. The geometry and location of the indicia may be determined by one skilled in the art to provide appropriate information to a user of the handle. For example, marks, numbers, a scale, and/or colors, etc., may be present on clutch plate 80 to indicate to the user information such as distance between holders 22, 24, size of articles, distance from centerline 32, etc. It should be understood that the indicating device could instead be a pointer or the like placed on clutch plate 80 with indicia on something attached to axle 38, or two pointers, with or without indicia.

Thus, a user wishing to change a spacing 34 of holders 22, 24 simply stops device 10, pulls handle 104 to disengage clutch plate 80 and gear 102 of clutch assembly 72, and then rotates the handle while observing the indicating device if present or the loops 18, 20 and holders 22, 24 directly until a desired new spacing 36 is achieved. Holders 22, 24 of each given pair are moved toward or away from each other an equal amount (depending on which way handle 104 way turned), and each pair of holders 22, 24 remains centered upon centerline 32. Handle 104 is then released and spring 112 urges gear 102 back into engagement with opening 100 in clutch plate 80. Device 10 can thus be restarted without need to jog one or both loops 18, 20 because the loops are still on pitch and timed with the overall system as before the rotation of handle 104.

In short, the method of use involves, releasing a clutch assembly and operating a handle assembly to adjust the positioning of both endless loops an equal amount in opposite directions. After adjustment, the clutch assembly is reengaged and the device can be operated.

It should be understood that various options and modifications in the above disclosure are possible within the scope of the present invention. For example, the manually operated clutch assembly 72 could be replaced by a servo motor, pneumatic or hydraulic clutch, if desired. Also, axial or rotational of movement of handle 104 could also be made via such devices. Accordingly, a more automated clutch and/or adjustment solution is also within the scope of the invention. All electronic or motor driven components may be controlled by a conventional programmable logic controller, such as those sold under the Allen-Bradley® trade name. One skilled in the art can readily program such controller to carry out the functions noted above based on system parameters such as the size, variation, speed, types of articles, etc.

Therefore, while preferred embodiments of the invention have been described above, it is to be understood that any and all equivalent realizations of the present invention are included within the scope and spirit thereof. Thus, the embodiments depicted are presented by way of example only and are not intended as limitations upon the present invention. Thus, while particular embodiments of the invention have been described and shown, it will be understood by those of ordinary skill in this art that the present invention is not limited thereto since many modifications can be made. Therefore, it is contemplated that any and all such embodiments are included in the present invention as may fall within the literal or equivalent scope of the appended claims

We claim:

1. An adjustable conveying device for conveying articles of differing sizes comprising:
    a first endless loop drivable along a path;
    holders mounted along the first endless loop;
    a second endless loop drivable along a path substantially along the path of the first endless loop;
    holders mounted along the second endless loop, each holder on the first endless loop forming a gripping pair with an adjacent holder on the second endless loop, each gripping pair being spaced equally from a center line between the holders of the gripping pair;
    a motor for driving the first and second endless loops at a common speed along their respective paths; and
    an adjustment assembly configured for simultaneously moving the first endless loop a distance in a first direction along its path and the second endless loop the distance in a second direction opposite the first direction along its path to thereby change spacing between the gripping pairs while maintaining the holders in each gripping pair equidistant from their respective center line, the adjustment assembly including a manually-operable input wheel, a manually-releasable adjustment clutch activation of which permits simultaneous movement of the first and second endless loops, a first shaft, a second shaft, and gearing, rotation of the input wheel after activation of the adjustment clutch moving via the gearing and first and second shafts, respectively, the first and second endless loops, respectively, in the first and second directions.

2. The device of claim 1, wherein the adjustment assembly includes a movable indicator to indicate the spacing of each gripping pair as the adjustment assembly moves the first and second endless loops.

3. A method of adjusting a spacing of holders located on a first endless loop and a second endless loop, the method comprising:
    releasing a clutch to allow the endless loops to be adjusted; and
    operating an adjustment assembly to simultaneously move the first endless loop a distance in a first direction and the second endless loop the distance in a second direction opposite the first direction to thereby change spacing between a gripping pair of holders while maintaining the holders in the gripping pair equidistant from a center line between the pair of holders, wherein the operating step includes releasing a manually-releasable adjustment clutch and rotating a manually-operable input wheel to effect the simultaneous movement of the first and second endless loops via gearing that respectively causes a first and second shaft to rotate the first and second endless loops, respectively, in the first and second directions.

* * * * *